United States Patent Office 3,205,183
Patented Sept. 7, 1965

3,205,183
PROCESS FOR PREPARING POLYMERIC OXE-
TANES USING HYDROCARBONALUMINUM
CHELATES AS CATALYSTS
Edwin J. Vandenberg, Wilmington, Del., assignor to
Hercules Powder Company, Wilmington, Del., a
corporation of Delaware
No Drawing. Filed Dec. 13, 1960, Ser. No. 75,487
The portion of the term of the patent subsequent to
June 2, 1981, has been disclaimed
21 Claims. (Cl. 260—2)

This application is a continuation-in-part of my U.S. application Serial No. 20,812, filed April 8, 1960, now abandoned.

This invention relates broadly to the preparation of polymers of oxetanes, also known as oxacyclobutanes and, more particularly, to an improved method for preparing high molecular weight polymeric oxetanes including copolymers of oxetanes with epoxides.

It is known that unsubstituted oxetane as well as variously substituted oxetanes having substituent groups in the 2-, 3- and 4-positions can be polymerized with Friedel-Crafts catalysts such as boron trifluoride or its complexes with either diethyl ether or acetic acid, zinc chloride, stannic chloride, aluminum chloride, gallium chloride, and the like, at temperatures between —80° C. and 150° C., and at catalyst concentrations between about 0.1% and 10% by weight, based on the weight of the monomer. At elevated temperatures above ordinary room temperature, the use of Friedel-Crafts catalysts has led to production of only low molecular weight oxetane polymers lacking the necessary strength and toughness properties for production of filaments, plastics and film, for example. Such low molecular weight oxetane polymers are obviously of quite limited utility, therefore. High molecular weight oxetane polymers, having a molecular weight of at least 10,000 and having physical properties which are suitable for the production of filaments, plastics, film and the like, have been obtained with Friedel-Crafts catalysts only when carried out at room temperature or preferably considerably below room temperature, and with relatively large amounts of catalyst. Needless to say, the requirement of low temperatures and large amounts of catalyst has seriously detracted from the efficacy of polymerization processes based on the use of Friedel-Crafts catalysts.

It is also known that certain oxetanes, namely 3,3-disubstituted oxetanes and, particularly, 3,3-bis(chloromethyl) oxetane can be polymerized in the presence of alkyl aluminum catalysts to give high molecular weight polymers having a molecular weight of at least 10,000 and having physical properties which are highly desirable as applied to the broad field of use for such polymeric materials. It was found that with alkyl aluminum catalysts high molecular weight polymers of 3,3-disubstituted oxetanes can be obtained under conditions of elevated temperatures and extremely low catalyst level. The discovery of alkyl aluminum catalysts thus opened the way for conducting continuous bulk polymerization of 3,3-disubstituted oxetanes at polymer melt temperatures, and this represented a significant and important advance over the previously known Friedel-Crafts catalysts.

However, bulk polymerization at polymer melt temperatures employing alkyl aluminum catalysts has presented problems of temperature control. This is because polymerization rate is quite sensitive to catalyst/monomer ratio at polymer melt temperatures in that an increment of catalyst so small as to be hard to control often makes the difference between no polymerization at a given temperature and polymerization so rapid in rate as to exceed the capacity of available heat removal mechanisms, such as boiling and refluxing monomer and/or convection and conduction through the reaction vessel walls.

Now, in accordance with the present invention, it has been discovered that the polymerization of oxetanes broadly, including unsubstituted oxetane and substituted oxetanes having substituent groups in the 2-, 3- and 4-positions in the oxetane molecule, and including copolymerization of mixtures of oxetanes, and mixtures of oxetanes and epoxides, is catalyzed by the reaction products of hydrocarbonaluminum compounds with certain chelating agents, which reaction products may be additionally reacted with water, if desired, as more fully described hereinafter. High molecular weight polymers of unsubstituted oxetane and variously substituted oxetanes having substituent groups in the 2-, 3- and 4-positions in the oxetane molecule, as well as copolymers of mixtures of oxetanes, and copolymers of mixtures of oxetanes and epoxides are obtained under a considerable range of conditions in accordance with this invention, including conditions of elevated temperatures and extremely low catalyst levels. Moreover, it was found that bulk polymerization of oxetanes at polymer melt temperatures catalyzed by the reaction products of hydrocarbonaluminum compounds with chelating agents in accordance with this invention is relatively insensitive to catalyst/monomer ratio, and is characterized by proceeding quite smoothly and uniformly and at a rate such that temperature is readily controlled by heat removal mechanisms such as by boiling and refluxing of monomer. It was also demonstrated that the present invention makes isothermal polymerization of oxetanes possible at polymer melt temperatures wherein excess heat of polymerization is removed by conduction and convection means, rather than by boiling and refluxing of the monomer. Heretofore this has been extremely difficult with alkyl aluminum catalysts. The present invention, therefore, affords considerable improvement with respect to control of bulk polymerization reactions of oxetanes at polymer melt temperatures.

Any oxetane characterized by the following generalized structural formula:

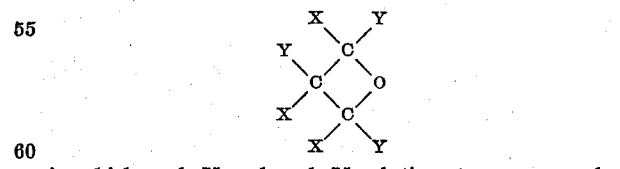

in which each X and each Y substituent group may be ny substituent, other than substituents having groups which can react with the catalyst, such as free hydroxyl, primary amino, or secondary amino group, is capable of being polymerized to high molecular weight polymers by the catalysts of this invention, by contacting the oxetane monomer with a catalytic amount of the reaction product formed by reacting a hydrocarbonaluminum compound with a suitable chelating agent.

Polymerization of oxetanes in accordance with this invention involves only the characteristic oxetane ring, whereby a substantially linear polyether molecule is formed by opening of the oxetane ring and joining together of the plurality of the resulting organic residues of oxetane molecules by ether linkages. This oxetane-coupling reaction which joins together a plurality of oxetane monomer molecules is illustrated by the following equation:

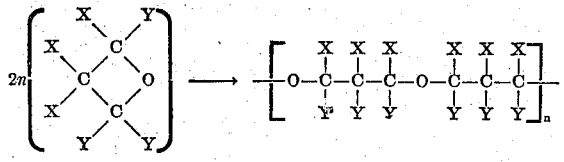

The nature of the substituents X and Y in the 2-, 3-, and 4-positions in the oxetane monomer molecule can be varied widely, provided, however, that substituents X and Y do not contain groups such as free hydroxyl, primary amino, or secondary amino groups which would react with the catalyst to destroy or inactivate the catalyst. By way of example, but not in limitation of the invention, suitable X and Y substituents include such substituents as hydrogen; halogens including fluoro, chloro, bromo and iodo substituent groups; alkyl, cycloalkyl, aryl and aralkyl groups such as methyl, ethyl, propyl, butyl, cyclohexyl, phenyl, tolyl, benzyl, and the like; nitroalkyl such as nitromethyl, nitroethyl and the like; nitratoalkyl such as nitratomethyl; nitratoethyl, and the like; cyanoalkyl such as cyanomethyl, cyanoethyl, and the like; alkoxy, aryloxy, aralkoxy, etc., such as methoxy, ethoxy, phenoxy, and the like; alkyl-, cycloalkyl-, aryl-, and aralkyloxymethyl groups such as methoxymethyl, ethoxymethyl, phenoxymethyl, benzyloxymethyl, and the like; acyloxyalkyl groups such as acetoxymethyl, acetoxyethyl, benzoxymethyl, and the like; haloalkyl groups such as chloromethyl, bromoethyl, iodomethyl, fluoromethyl, chloroethyl, chloropropyl, and the like; tertiary aminoalkyl groups such as dimethylaminomethyl, dimethylamino ethyl, and the like; acylaminoalkyl groups such as acetamidomethyl, sulfonamidomethyl, and the like; ethylenically unsaturated aliphatic radicals such as vinyl, propenyl, isopropenyl, allyl, methallyl, butenyl, allyoxymethyl, propenyloxymethyl, methallyloxymethyl, oleyl, and the like; and cycloalkyl or aryl radicals containing an ethylenically unsaturated substituent and cycloalkyl radicals containing an ethylenic double bond in the ring, as for example, 4-vinylcyclohexyl, α-terpinyl, γ-terpinyl, pinetyl, cyclohexenylmethyl, o-allylphenyl, p-vinylbenzyl, and the like.

It is seen, therefore, that suitable X and Y substituent groups in the 2-, 3-, and 4-positions in the oxetane monomers include, without limitation, all groups which are substantially nonreactive with the catalysts employed in this invention. As illustrative of some typical oxetanes which can be polymerized and copolymerized by the catalysts of this invention to form high molecular weight polymers, but not in limitation of the invention thereto, are such compounds as: oxetane, also designated herein as unsubstituted oxetane; or

oxetane; and the like; 2-vinyl-3,3-bis(chloromethyl)oxetane where all X and Y substituents are hydrogen;

2-bromo oxetane;
2-methyl oxetane;
2-cyclohexyl oxetane;
2-benzyl oxetane;
2-nitropropyl oxetane;
2-cyanoethyl oxetane;
2-methoxy oxetane;
2-phenoxy oxetane;
2-methoxyethyl oxetane;
2-benzyloxymethyl oxetane;
2-allyl oxetane;
2-vinylbenzyl oxetane;
2-chloromethyl oxetane;

and the like;

2,2-bis(chloromethyl)oxetane;
2,2-bis-(2-chloroethyl)oxetane;
2,2-dimethyl oxetane;
2-chloro-2-methyl oxetane;
2-fluoro-2-bromomethyl oxetane;
2,2-bis(nitratomethyl)oxetane;
2-methoxy-2-methyl oxetane;
2-carbomethoxy-2-chloromethyl oxetane;
2-methallyl-2-methyl oxetane;

and the like;

2-vinyl-3,3-bis(chloromethyl)oxetane;
2-methyloxy-3,3-bis(bromomethyl)oxetane;
2-vinylbenzyl-3,3-dimethyl oxetane;
2-allyloxymethyl-3-chloromethyl-3-ethyl oxetane;
2-phenoxymethyl-3-fluoro-3-methyl oxetane;

and the like;

2-methyl-3,3-bis(chloromethyl)-4-methyl oxetane;
2-vinyl-3,3-bis(iodomethyl)-4-methoxy oxetane;
2-chloromethyl-3,3-dimethyl-4-chloromethyl oxetane;
2-chloro-3-ethyl-3-methoxymethyl-4-(o-allylphenyl)-oxetane;
2-ethyl-3,3-bis(phenoxymethyl)-4-allyl oxetane;

and the like;

2-methyl-3-methyl oxetane;
2-chloromethyl-3-bromo oxetane;
2-methoxy-3-butenyl oxetane;
2-methallyloxymethyl-3-ethyl oxetane;
2-propenyl-3-bromoethyl oxetane;
2-methoxymethyl-3-propyl oxetane;

and the like;

3-chloro oxetane;
3-ethyl oxetane;
3-cyclohexyl oxetane;
3-phenyl oxetane;
3-methoxy oxetane;
3-allyl oxetane;
3-chloromethyl oxetane;
3-vinyl oxetane;

and the like;

3,3-bis(chloromethyl)oxetane;
3,3-bis(bromomethyl)oxetane;
3,3-bis(iodomethyl)oxetane;
3,3-bis(fluoromethyl)oxetane;
3,3-bis(2-chloroethyl)oxetane;
3-bromomethyl-3-chloromethyl oxetane;
3,3-dimethyl oxetane;
3,3-diethyl oxetane;
3,3-bis(chloro)oxetane;
3,3-bis(bromo)oxetane;
3-chloro-3-chloromethyl oxetane;
3-bromo-3-ethyl oxetane;
3-fluoro-3-bromomethyl oxetane;
3-fluoro-3-chloro oxetane;

3-ethyl-3-methyl oxetane;
3-chloromethyl-3-ethyl oxetane;
3-chloromethyl-3-methyl oxetane;
3,3-bis(cyanomethyl)oxetane;
3,3-bis(nitratomethyl)oxetane;
3-chloromethyl-3-nitromethyl oxetane;
3-methoxy-3-methyl oxetane;
3-ethyl-3-methoxymethyl oxetane;
3-ethoxymethyl-3-methyl oxetane;
3-carbomethoxy-3-chloromethyl oxetane;
3,3-bis(phenoxymethyl)oxetane;
3-vinyl-3-methyl oxetane;
3-allyl-3-chloromethyl oxetane;
3-isopropenyl-3-ethyl oxetane;
3-chloromethyl-3-(4-vinylcyclohexyl)oxetane;
3-methyl-3-methallyl oxetane;
3,3-bis(allyl)oxetane;

and the like;

2-methyl-3-methyl-4-methyl oxetane;
2-ethyl-3-chloromethyl-4-ethyl oxetane;
2-chloromethyl-3-vinyl-4-chloromethyl oxetane;
2-methoxy-3-bromo-4-methyl oxetane;
2-allyl-3-methoxy-4-carbomethoxy oxetane;

and the like;

2-methyl-4-methyl oxetane;
2-vinyl-4-chloroethyl oxetane;
2-chloro-4-allyl oxetane;
2-methoxy-4-ethyl oxetane;
2-chloromethyl-4-chloromethyl oxetane;
2-chloromethyl-4-cyanomethyl oxetane;

and the like;

Moreover, the properties of the end product polymers may be modified by copolymerization of any mixture of two or more of the above monomeric materials with each other or with other obviously equivalent oxetane monomers as explained hereinabove.

This invention also contemplates copolymerization of oxetanes with epoxides to form various binary copolymers, ternary copolymers, quaternary copolymers, and the like. Exemplary of typical epoxides that may be copolymerized with oxetanes to produce high molecular weight polymers are the alkylene oxides such as ethylene oxide, propylene oxide, butene-1 oxide, cis and trans butene-2 oxides, hexene-1 oxide, hexene-2 oxide, dodecene-1 oxide, hexadecene-1 oxide, octadecene-1 oxide, isobutylene epoxide, and the like;

substituted alkylene oxides such as epihalohydrins as, for example, epichlorohydrin, epibromohydrin, epifluorohydrin, epiiodohydrin, 2-chloroethyl glycidyl ether, chloroprene monoxide, methallyl chloride epoxide, trifluoromethylethylene oxide, perfluoropropylene oxide, perfluoroethylene oxide, vinyl chloride epoxide, dichloroisobutylene epoxide, 1,2-dichloro-3,4-epoxybutane, 1-chloro-3,4-epoxybutane, 1-chloro-4,5-epoxybutane, 1,1-dichloro-2,3-epoxypropane, 1,1,1-trichloro-2,3-epoxypropane, 1,1,1-trichloro-3,4-epoxybutane, and the like;

cycloaliphatic epoxides such as cyclohexene oxides, vinyl cyclohexene oxides (both mono- and dioxides), α-pinene epoxide, dipentene epoxide, and the like;

epoxy ethers such as alkyl glycidyl ethers as, for example, methyl glycidyl ether, ethyl glycidyl ether, isopropyl glycidyl ether, isobutyl glycidyl ether, tert-butyl glycidyl ether, n-hexyl glycidyl ether, n-octyl glycidyl ether, and the like;

phenyl glycidyl ether, chlorophenyl glycidyl ethers, nitrophenyl glycidyl ethers, alkylphenyl glycidyl ethers, chloroalkyl glycidyl ethers, such as chloroethyl glycidyl ether, bromoethyl glycidyl ether, 2-chloro-1-methylethyl glycidyl ether, and the like;

unsaturated glycidyl ethers such as vinyl glycidyl ether, propenyl glycidyl ether, isopropenyl glycidyl ether; allyl glycidyl ether, methallyl glycidyl ether, butenyl glycidyl ether, oleyl glycidyl ether, vinylcyclohexyl glycidyl ether, α-terpinyl glycidyl ether, γ-terpinyl glycidyl ether, cyclohexenyl methyl glycidyl ether, o-allylphenyl glycidyl ether, p-vinylbenzyl glycidyl ether, and the like;

glycidyl esters such as glycidyl acetate, glycidyl propionate, glycidyl pivalate, glycidyl methacrylate, glycidyl acrylate, and the like;

alkyl glycidates such as methyl glycidate, ethyl glycidate, and the like;

and other epoxides as, for example, styrene oxide, α-methylstyrene oxide, butadiene monoxide, butadiene dioxide, epoxy stearates, 3,4-epoxy-1-pentene, 4,5-epoxy-2-pentene, 3,4-epoxy-1-vinylcyclohexene, 1,2-epoxy-5,9-cyclododecadiene, divinylbenzene monoxide, 5,6-epoxy-1,7-octadiene, and the like;

Mixtures of any of these epoxides may be used for copolymerization with oxetanes so that the resulting copolymer is a ternary polymer, quaternary polymer, etc., or any other obviously equivalent epoxide may be included to produce a terpolymer, quaternary polymer, etc. As will be obvious to one skilled in the art, all of the above-named epoxides are epoxides in which the oxygen forms a three-membered ring with two adjacent carbon atoms, which epoxides are known as vicinal epoxides.

It has been found that any mixture of oxetanes and epoxides can be polymerized to high molecular weight polymers in accordance with this invention. Preferred mixtures, however, contain at least about 5% of oxetane, and correspondingly not more than about 95% by weight of epoxide.

Oxetane polymers which contain ethylenically unsaturated groups and are elastomeric in nature are of special interest since such polymers are capable of being vulcanized with sulfur to yield highly desirable rubbers. In the unvulcanized state, they are elastomeric polymers which are generally snappy, tough rubbers, and preferably have molecular weights of at least about 50,000. Such oxetane polymers having ethylenically unsaturated groups may be homopolymers derived from such oxetane monomers as, for example, 2-methyl-3-allyl oxetane, copolymers derived from mixtures of oxetane monomers as, for example, unsubstituted oxetane,

or 2-methyloxetane or 3,3-dimethyloxetane, with an oxetane containing ethylenically unsaturated groups as, for example, 2-methyl-3-allyloxy oxetane, or 3-chloromethyl-3-vinyl oxetane, and copolymers derived from mixtures of oxetane monomers and epoxide monomers, as for example, mixtures of unsubstituted oxetane with allyl glycidyl ether, and mixtures of 2-methyloxetane, or 3,3-disubstituted oxetane such as 3,3-dimethyloxetane, with an ethylenically unsaturated epoxide. Although largely amorphous polymers are preferred for best rubbery characteristics, some degree of crystallinity in the polymer is somewhat advantageous in some instances. The amount of crystallinity should not exceed that amount which interferes materially with the rubbery properties. In general, crystallinity in these polymers containing ethylenically unsaturated groups should be below about 25% and preferably below about 15%.

Other copolymers of interest are binary copolymers derived from oxetane monomers and halogen-substituted epoxide monomers such as mixtures of an oxetane monomer and an epihalohydrin and ternary polymers derived from mixtures of oxetane monomers, alkylene oxide monomers, and either halogen-substituted epoxide monomers or epoxide monomers having ethylenic unsaturated groups, as for example ternary copolymers derived from mixtures of unsaturated oxetane, propylene oxide, and epichlorohydrin; or a terpolymer derived from unsubstituted oxetane, propylene oxide, and allyl glycidyl ether. It has also been found in accordance with this invention that copolymers derived from mixtures of oxetane monomers and halogen substituted epoxide monomers are generally more flexible at low temperatures than polymers derived solely from halogen substituted epoxide monomers such as polymers of epichlorohydrin. It has also been found that copolymers derived from mixtures of oxetane monomers and ethylene oxide are much less crystalline and of greatly improved water resistance than ethylene oxide polymers.

The catalysts of this invention are chelated reaction products formed by reacting a hydrocarbonaluminum compound with a suitable chelating agent, which reaction products may be additionally reacted with water, if desired.

Suitable hydrocarbonaluminum compounds for the purposes of this invention include without limitation any hydrocarbonaluminum compound, such as, trihydrocarbonaluminum or dihydrocarbonaluminum hydride, and complexes thereof with alkali metal hydrocarbons or hydrides, typical hydrocarbon radicals being alkyl, alkenyl, cycloalkyl, cycloalkenyl, aryl, alkaryl or aralkyl radicals. As illustrative of these aluminum compounds are such compounds as:

trimethylaluminum,
triethylaluminum,
tripropylaluminum,
triisopropylaluminum,
triisobutylaluminum,
trihexylaluminum,
trioctylaluminum,
tridodecylaluminum,
tricyclohexylaluminum,
triphenylaluminum,
triisopropenylaluminum,
tris(2-cyclohexenylethyl)aluminum, etc.,
diethylisobutylaluminum,
monoethyl diisobutylaluminum,
diisobutylmonophenylaluminum, etc.,
the dihydrocarbonaluminum hydrides such as
diethylaluminum hydride,
diisobutylaluminum hydride,
dicyclohexylaluminum hydride,
monoethylmonoisobutylaluminum hydride, etc.

and their complexes such as the alkali metal aluminum tetrahydrocarbons and hydrocarbon hydrides, as for example, lithium aluminum tetrahydrocarbons, sodium aluminum tetrahydrocarbons, sodium aluminum trihydrocarbon hydride, etc.

As pointed out above, these hydrocarbonaluminum compounds are reacted with a chelating agent, i.e., a compound containing a chelate group. Suitable chelating agents in accordance with this invention are characterized by two functional groups, one of which is an —OH group such as an alcoholic hydroxyl, the OH of a carboxyl group, or the OH in the enol form of a ketone, etc., which —OH reacts with the trihydrocarbonaluminum or dihydrocarbonaluminum hydride to form a conventional, covalent aluminum-oxygen bond according to the following equation:

$$R'R_2Al + -OH \rightarrow R_2Al-O- + R'H$$

where R is hydrocarbon radical and R' is hydrogen or hydrocarbon radical. The second functional group is one which contains an oxygen atom that forms a coordinate bond with the aluminum. Examples of groups containing such oxygen are:

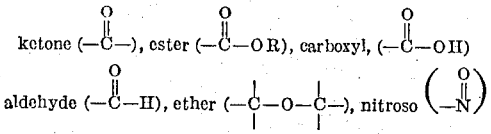

and

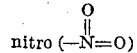

groups. Such chelating agents thus form with the trihydrocarbonaluminum or dihydrocarbonaluminum hydride a coordinated ring of the following graphic structure:

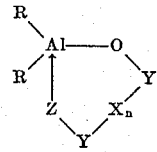

in which R represents hydrocarbon radical, each Y represents an element selected from the group consisting of carbon and nitrogen, X represents carbon, n is a numeral of the group consisting of 0, 1 and 2, and Z is an oxygen atom which forms a coordinate bond with the aluminum. When each Y is nitrogen, n is preferably 1 or 2. However, in the preferred chelated reaction products of this invention each Y is carbon, and n is preferably 0 or 1. Thus, the chelated reaction products of this invention are characterized (1) by having at least one aluminum to carbon bond, and (2) by having a conventional aluminum-oxygen-carbon, or nitrogen, bond sequence and coordination of aluminum with an oxygen capable of forming a coordinate bond with the aluminum in a 5, 6 or 7-membered ring containing carbon, oxygen, and aluminum, with or without nitrogen, atoms.

As illustrative of chelating agents having the above set forth characteristic functional groups and that can be reacted with a trihydrocarbonaluminum or dihydrocarbonaluminum hydride to produce the catalysts of this invention are such compounds as diketones, such as acetylacetone (2,4-pentanedione), trifluoroacetylacetone, acetonylacetone, benzoylacetone, furoylacetone, dibenzoylmethane, 3-methyl-2,4-pentanedione, 3-benzyl-2,4-pentanedione, etc.; ketoacids such as acetoacetic acid, ketoesters such as ethyl acetoacetate, ketoaldehydes such as formylacetone, hydroxyketones such as hydroxyethyl methyl ketone, hydroxyacetone, o-hydroxyacetophenone, 2,5-dihydroxy-p-benzoquinone, etc.; hydroxyaldehydes such as salicylaldehyde, hydroxy esters such as ethyl glycolate, 2-hydroxyethyl acetate, monoesters of oxalic acid, mono- and diesters of malonic acid, etc., dialdehydes such as malonaldehyde, alkoxyacids such as ethoxyacetic acid, etc., ketoximes such as 2,3-butanedione-monoxime, etc., dialdehyde monoximes such as glyoxal monoxime, etc., hydroxamic acids such as N-phenyl benzohydroxamic acid, etc., dioximes such as dimethyl glyoxime, etc., nitro compounds such as 1,3-nitroalcohols, 1,3-nitroketones, 2-nitroacetic acid, nitroso compounds such as 1,2-nitrosooximes, etc. This invention also contemplates employment of compounds such as 1,2-keto-oximes which can exist in two or more similar resonating forms, at least one of which is capable of forming a chelated reaction product with hydrocarbonaluminum compounds in accordance with this invention. Chelating agents with two or more chelating functions may also be used, as for example, 2,5-dihydroxy-p-benzoquinone, bis(1,3-diketones) such as $(CH_3CO)_2CHCH(COCH_3)_2$, bis(1,2-dioximes) etc.

Thus, it will be seen that the two necessary functional groups in the chelating agent, namely, the reactive hydroxyl group and the coordinating oxygen atom are separated in the molecule from each other by at least two and not more than four atoms, which may be carbon atoms, nitrogen atoms, or a combination of carbon and nitrogen atoms in accordance with the graphic structure set forth hereinbefore.

For example, when one mole of a trihydrocarbonaluminum or a dihydrocarbonaluminum hydride is reacted with one mole of acetylacetone (2,4-pentanedione), the chelated reaction product may be represented by the following graphic formula:

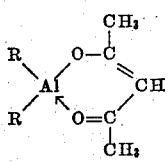

in which R represents hydrocarbon radicals. Similarly, when one mole of a trihydrocarbonaluminum or a dihydrocarbonaluminum hydride is reacted with one mole of hydroxyacetone, or with one mole of ethoxyacetic acid, the respective chelated reaction products may be represented by the following graphic formulas:

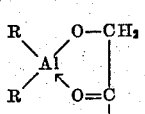   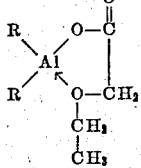

with hydroxyacetone   with ethoxy acetic acid

The amount of chelating agent reacted with the hydrocarbonaluminum compound will generally be within the range from about 0.01 to about 2 moles of chelating agent per mole of hydrocarbonaluminum compound, and preferably will be from about 0.1 to about 1 mole per mole of hydrocarbonaluminum compound.

Any desired procedure may be used for reacting the hydrocarbonaluminum compound with the specified molar ratio of chelating agent. It is readily done by adding the specified amount of chelating agent gradually with stirring and at room temperature to a solution of the hydrocarbonaluminum compound in an inert diluent as, for example, a hydrocarbon diluent such as n-heptane, toluene, or an ether such as diethylether, tetrahydrofuran, etc., or a mixture of such diluents. It can also be done in the absence of a diluent. The resulting chelated reaction product may be used immediately after preparation or it may be aged or, if desired, heat-treated in some cases. It is also possible to form the chelate in situ in the monomer to be polymerized.

As previously pointed out, the chelated reaction products employed as catalysts in accordance with this invention, and formed by reacting a hydrocarbonaluminum compound with a chelating agent, can be additionally reacted with water, if desired. When the catalysts are formed by reacting a hydrocarbonaluminum compound with a chelating agent and with water, it has been found that the hydrocarbonaluminum compound may be reacted with the chelating agent and the resulting chelated reaction product may then be reacted with water. Alternatively, the hydrocarbonaluminum compound may first be reacted with water and then with the chelating agent. For that matter, the hydrocarbonaluminum compound can, if desired, be reacted simultaneously with both the water and the chelating agent. Irrespective of the order of bringing the reactants together, however, it has been found that any amount of water up to about 1.5 moles of water per mole of hydrocarbonaluminum compound can be advantageously employed in preparing the catalysts of this invention. Preferably the amount of water employed will be between about 0.1 mole and about 1 mole for each mole of hydrocarbonaluminum compound. It should be pointed out, however, that when the larger amounts of chelating agent are employed, the amount of water employed should be proportionately less, since the combined amounts of chelating agent and water should be such as to leave residual hydrocarbon substituent groups in the catalyst. The characteristic coordinated ring structure of the chelated catalysts of this invention, as set forth and described hereinabove, is not disturbed by additional reaction with water.

Polymerization temperature in accordance with this invention can be varied over a wide range, as for example, from about −50° C. to about 300° C., suitable temperatures below about 100° C., for example, being convenient when conducting diluent polymerization reactions. Preferably, however, bulk polymerizations will be carried out at temperatures from about 100° C. to about 260° C., and particularly in the range of polymer melt temperatures.

The polymerization of oxetanes in accordance with this invention may be carried out under a considerable range of conditions by any desired means, either as a batch or continuous process in the presence of a chelated reaction product catalyst formed by reacting a hydrocarbonaluminum compound with a chelating agent as set forth hereinabove. Preferably the polymerization reaction will be conducted under conditions which exclude excessive moisture and air, and this can be most conveniently accomplished in vessels closed to the atmosphere. Under conditions where diluent polymerization reactions are desired, the diluents of utility are those that do not react either with the monomers or the catalyst. Such diluents include, by way of example, aromatic hydrocarbons such as benzene, toluene, etc., saturated aliphatic hydrocarbons and cycloaliphatic hydrocarbons such as n-heptane, cyclohexane, etc., halogenated hydrocarbons such as chlorobenzenes or haloalkanes such as methyl chloride, methylene chloride, chloroform, carbon tetrachloride, ethylene dichloride, tetrachloroethane, trifluoro-1,1,2-tribromomethane, etc., and ethers such as the dialkyl, aryl or cycloalkyl ethers as, for example, diethyl ether, dipropyl ether, diisopropyl ether, etc. Obviously, any mixture of such diluents may be used.

Preferably, however, the polymerization reaction will be carried out as a continuous bulk polymerization at elevated temperatures, usually in the range of polymer melt temperatures, since it is under such conditions that the present invention exhibits one of its principal advantages. In such bulk polymerizations it is preferred to continuously feed purified oxetane monomer, for example, 3,3-bis(chloromethyl)oxetane and the desired amount and type of chelated hydrocarbonaluminum reaction product catalyst, for example, the reaction product formed by reacting 1 mole of a trialkylaluminum with from about 0.01 to about 2 moles of 2,4-pentanedione into the top of a substantially vertical, elongated polymerization tower of sufficient diameter to permit gravity flow therethrough of a mass of such material being polymerized therein, and fitted with a condenser and initially heated by suitable means, jacket heat for example, to a temperature of about 210° C. Under these conditions the polymerization reaction mass rapidly reaches polymerization temperatures, and the excess exothermic heat of polymerization is removed from the mass by boiling and substantial vaporization of the monomer. Condensed monomer preferably is recycled to the polymerization. As the polymerization continuously proceeds, the viscous molten polymer mass slowly settles by gravity to the bottom of the tower and after a suitable residence time to effect substantially complete polymerization of polymer therein is discharged from the bottom of the tower at a rate to maintain the tower in balance relative to charge and discharge, and to maintain a substantially constant mass of material being polymerized in the polymerization tower.

The high molecular weight polymers obtained in accordance with this invention may be separated from the polymerization reaction mass by standard conventional procedures. For example, when conducting diluent polymerizations, the insoluble polymer which separates during the polymerization is collected, washed with an aqueous acid to extract catalyst residues, then washed free of acid with water, stabilized if necessary or desired, and then dried, usually in vacuo at any convenient temperature. In bulk polymerizations at polymer melt temperatures, the molten reaction mixture is either quenched in a polymer nonsolvent such as methanol, water or carbon tetrachloride or the mass may be cooled, ground, and if necessary or desired, washed and then dried as set forth above for treatment of polymer prepared by diluent polymerization.

The amount of hydrocarbonaluminum chelate employed to catalyze polymerization of oxetanes and copolymerization of oxetanes with epoxides in accordance with this invention can range from a minute catalytic amount up to a large excess, and amounts from about 10 p.p.m. to about 100,000 p.p.m., based on total monomer weight, have been employed, the larger amounts in excess of about 15,000 p.p.m. having been employed in diluent polmerizations. In general, however, for bulk polymerizations the amount of catalyst employed will be within the range from about 10 p.p.m. to about 15,000 p.p.m. based on the weight of monomer. Generally, an amount of catalyst will be chosen which will promote a practical rate of polymerization under the conditions selected; and there is no advantage to be gained by using catalyst in excess of such an amount. Preferably the amount of catalyst employed will be within the range from about 10 p.p.m. to about 6,000 p.p.m., and still more preferably will be within the range from about 100 p.p.m. to about 1,000 p.p.m. for production of high-grade products and, particularly, for products to be utilized in association with electrical equipment. In many instances it is convenient to express the amount of catalyst employed in terms of milliatoms of aluminum per kilogram of oxetane monomer. The amount of catalyst used depends in part on such factors as monomer purity, temperature, diluent purity, the particular chelated hydrocarbonaluminum reaction product chosen, etc., less pure oxetane monomers and diluents requiring more catalyst to destroy reactive impurities. Accordingly, impurities such as carbon dioxide, oxygen, aldehydes, alcohols, etc., should be kept at as low a level as possible to minimize unnecessary catalyst consumption. However, irrespective of the type or conditions of polymerization chosen, the amount of catalyst employed will be sufficient to catalyze polymerization of oxetanes or copolymerization of oxetanes with epoxides to polymers having a molecular weight of at least 10,000, and preferably at least about 50,000, which, expressed in terms of reduced specific viscosity, $\eta_{sp/c}$, means a reduced specific viscosity of at least 0.3, and preferably at least about 1.0 as measured on a solution of known concentration of the polymer in a solvent for the polymer at a suitable temperature. In the expression $sp/c$ for defining reduced specific viscosity, the symbol $sp$ stands for specific viscosity and the symbol C stands for concentration of the polymer in the solution thereof in solvent.

Polymerization reaction time may be varied over a very wide range from a few minutes, for example, about 5 minutes, to several hours or even days with no detrimental effects under conditions where a prolonged reaction time is required or desired. Generally, diluent polymerizations require considerably longer reaction time than bulk polymerization at polymer melt temperatures.

Additionally, antioxidants, stabilizers, plasticizers and other additives such as fillers, pigments or other colorants may be incorporated with the polymers obtained in accordance with this invention. The specific materials utilized and their method of incorporation will, of course, depend on the intermediate and the finished products desired and, in general, additive incorporation may take place with the monomers, comonomers or prepolymers as well as the end product polymers.

From the foregoing, it is evident that there are numerous factors which will influence conditions for the most satisfactory operation of this invention, the actual requirements of which can be determined only by a detailed study of each set of starting materials and the intermediate and finished products desired.

The general nature of the invention having been set forth, the following examples illustrate some specific embodiments of the invention. It is to be understood, however, that the invention is in no way limited to the examples, since this invention may be carried out by the use of various modifications and changes within the scope of the invention as set forth herein.

EXAMPLES 1–9

The catalysts employed in Examples 1, 3, 5, 7 and 8 were prepared by dropwise addition of the calculated amount of chelating agent to a 0.9 molar solution of triisobutylaluminum in heptane at room temperature while stirring. The catalysts employed in Examples 2, 4, 6 and 9 were prepared by first adding the calculated amount of water dropwise to a 0.9 molar solution of triisobutylaluminum in heptane at room temperature while stirring, followed by dropwise addition of the calculated amount of chelating agent under the same conditions of temperature and agitation. The catalysts were stored at room temperature in closed bottles until used. The polymerization vessel employed in each example was a substantially vertical, cylindrical, jacketed tower surmounted by a reflux condenser and having a charging inlet line at the top and an adjustable discharge valve at the bottom of the tower. The polymerization tower was held at 210° C. by jacket heat at the start of each polymerization, and at polymer melt temperature during polymerization. In each example, the calculated amount of catalyst was premixed with purified 3,3-bis(chloromethyl)oxetane at room temperature immediately prior to the polymerization, and was fed into the heated polymerization tower through the inlet line over a period of 7 minutes and at a rate equal to 120 pounds per hour per square foot of horizontal cross section of the tower, and was held in the polymerization tower for an additional 15 minutes. In each example the resulting molten polymer mass was then discharged from the bottom of the polymerization tower, chilled, ground, separated from residue monomer by molecular distillation and then analyzed. In each example the polymerization proceeded smoothly and uniformly and at a rate such that temperature was readily controlled by boiling and refluxing of the monomer.

The following table sets forth pertinent data with respect to catalyst compositions and amount, polymerization temperatures, percent conversion and reduced specific viscosity of the polymer product for each example.

Table.—Polymerization of 3,3-bis(chloromethyl)oxetane with alkylaluminum chelates

| Exam. No. | Catalyst composition | | | | Catalyst amount in terms of milliatoms of aluminum in catalyst per kilogram of 3,3-bis(chloromethyl)oxetane | Temp. at which polymerization started, °C. | Max. temp. reached during polymerization, °C. | $\eta_{sp}/c^1$ | Conv. of monomeric 3,3-bis (chloromethyl) oxetane to polymer percent [2] |
|---|---|---|---|---|---|---|---|---|---|
| | Triisobutylaluminum, moles | Chelating agent | | Water, moles | | | | | |
| | | Kind | Moles | | | | | | |
| 1 | 1 | 2,4-pentanedione. | 0.2 | | 3 | 114 | 254 | 1.28 | 81.9 |
| 2 | 1 | ---do--- | 0.2 | 0.5 | 3 | 111 | 250 | 0.94 | 88.9 |
| 3 | 1 | ---do--- | 0.2 | | 6 | 129 | 246 | 1.77 | 89.1 |
| 4 | 1 | ---do--- | 0.2 | 0.5 | 6 | 137 | 253 | 0.97 | 93.4 |
| 5 | 1 | ---do--- | 0.5 | | 6 | 179 | 205 | 2.11 | 35 |
| 6 | 1 | ---do--- | 0.5 | 0.5 | 6 | | 226 | 4.32 | 50.6 |
| 7 | 1 | 3-hydroxy-2-propanone. | 0.5 | | 6 | 190 | 245 | 1.43 | 79 |
| 8 | 1 | Ethoxyacetic acid. | 0.5 | | 6 | 165 | 199 | 0.69 | 66 |
| 9 | 1 | ---do--- | 0.5 | 0.5 | 6 | 163 | 205 | 1.23 | 79 |

[1] $\eta_{sp}/c$ = Reduced specific viscosity of polymer determined as 1% solution of the polymer dissolved in cyclohexanone at 50° C. after removal of unreacted monomer as set forth in ([2]) below.
[2] Calculated as the nonvolatile product remaining after subjecting the polymerization product to distillation at 170° C. and a pressure of 1 to 5×10⁻⁴ cm. of mercury in a molecular still.

With reference to the above examples, it will be seen that this invention provides an expeditious method of polymerizing oxetanes at low catalyst level to polymers having molecular weights in excess of 10,000, for the polymers obtained had reduced specific viscosities of between 0.69 and 4.32. As pointed out previously, a reduced specific viscosity of 0.5 corresponds to a molecular weight of about 10,000.

The low percentage conversion in Examples 5 and 6 should not be regarded as indicating unsatisfactory polymerizations. On the contrary, the data for Examples 5 and 6 are indicative of highly satisfactory polymerization, as evidenced by the high specific viscosities of the polymer products, indicating well controlled, very uniform polymerization proceeding at a rate insufficient to complete polymerization within the arbitrary time selected.

EXAMPLE 10

The data in Examples 5 and 6 suggested the possibility of conducting isothermal bulk polymerization of oxetanes employing only convection and conduction through the reaction chamber walls to remove excess exothermal heat of polymerization. Accordingly, employing the same oxetane monomer, and the same catalyst in the same amount as set forth in Example 6, a polymerization was carried out by heating 50 ml. of the oxetane-catalyst mixture for 2 hours in a closed tube 6 inches long and 1½ inches in diameter immersed in an oil bath maintained at 200° C. The polymerization proceeded smoothly and uniformly, and at no time did the temperature of the polymerizing mass, measured by a thermocouple immersed in the polymerization reaction mass, exceed the bath temperature. Analysis showed 86.7% of the monomer was converted to a polymer having a reduced specific viscosity, $\eta_{sp/c}$, of 1.82, as measured on a 1% solution of the polymer in cyclohexanone at 50° C., after removal of unreacted monometer by molecular distillation, as set forth for Examples 1–9. Heretofore, such isothermal polymerization of 3,3-bis(chloromethyl)oxetane has been virtually impossible in the range of polymer melt temperatures.

In the following examples, all parts and percentages are by weight unless otherwise indicated.

EXAMPLE 11

A polymerization vessel in which air had been replaced with nitrogen was charged with 66 parts of n-heptane and 10 parts of unsubstituted oxetane,

and the vessel and contents were adjusted to 30° C. Then, while at 30° C., a chelated reaction product made from 1 mole triethylaluminum-0.5 mole acetylacetone-0.5 mole water dissolved in n-heptane and diethyl ether and equivalent to 0.46 part of triethylaluminum was added as catalyst, and the polymerization reaction mixture was agitated for 16 hours at 30° C. and then 8 hours at 50° C., when an equal amount more of the catalyst was added and the polymerization continued for 52 hours at 50° C. The polymerization was stopped by adding 4 parts of anhydrous ethanol. The reaction mixture was then diluted with ether, the insoluble polymer was collected and washed once with ether. It was then dissolved in an 80/20 mixture of ether/methanol containing 0.5% HCl. The polymer was recovered therefrom by precipitating with 5 volumes of methanol, collecting the precipitated polymer, washing neutral with methanol and then once with methanol containing 0.05% of 4,4'-thiobis(6-tert-butyl-m-cresol), and then drying the polymer for 16 hours in vacuo at 80° C. The resulting dried polymer, obtained in 48% yield based on starting unsubstituted oxetane, was a rubbery solid having a reduced specific viscosity, $\eta_{sp/c}$, of 12 as determined on a 0.1% solution of the polymer in chloroform at 25° C., and which could be cold drawn to a tough film. It was moderately crystalline by X-ray.

The catalyst for this example was prepared by adding 0.29 part of diethyl ether to the above-indicated amount of triethylaluminum, namely, 0.46 part, dissolved in 1.6 parts of n-heptane. Then, at 0° C., 0.2 part of acetylacetone was added and after stirring for 1 hour at 0° C., 0.036 part of water was added and stirring was continued 15 minutes at 0° C. and then 2 hours at room temperature. This catalyst was stored at room temperature before use.

EXAMPLE 12

A polymerization vessel in which air had been replaced with nitrogen was charged with 63 parts of n-heptane and 10 parts of unsubstituted oxetane,

and the vessel and contents were adjusted to 65° C. Then, while at 65° C., a chelated reaction product made from 1 mole triethylaluminum-1 mole acetylacetone-0.5 mole water dissolved in n-heptane and diethyl ether and equivalent to 0.92 part of triethylaluminum was added as catalyst, and the polymerization reaction mixture was agitated for 19 hours at 65° C. The catalyst for this example was prepared by adding 1.78 parts of diethyl ether to a solution of the above-indicated amount of triethylaluminum, namely, 0.92 part, dissolved in 3.2 parts of n-heptane. Then, at 0° C., 0.8 part of acetylacetone was added over a period of 15 minutes while stirring. The mixture was stirred for an additional hour at 0° C., whereupon 0.072 part of water was added over a period of 15 minutes. The mixture was stirred for an additional 15 minutes at 0° C., and then for 2 hours at room temperature. The catalyst was stored at room temperature before use.

The polymerization was stopped by adding 4 parts of anhydrous ethanol. The reaction mixture was then diluted with ether and was washed twice with water containing 3% HCl. The insoluble polymer was collected on a filter, washed several times with ether and once with ether containing 0.04% of 4,4′-thiobis(6-tert-butyl-m-cresol). The polymer was then washed neutral with water and then with water containing 2% $NaHCO_3$ and then further water-washed until neutral. The washed polymer was dried for 16 hours at 80° C. in vacuo. The resulting dried polymer, obtained in 67% yield based on starting unsubstituted oxetane, was a very tough rubbery solid having a reduced specific viscosity, $\eta_{sp/c}$, of 22.3 as determined on a 0.1% solution of the polymer in chloroform at 25° C. It was moderately crystalline by X-ray and was insoluble in water, heptane and methanol but soluble in acetone, benzene and ethylene dichloride.

EXAMPLE 13

A polymerization vessel in which air had been replaced with nitrogen was charged with 63 parts of n-heptane and 10 parts of 2-methyl oxetane, and the vessel and contents were adjusted to 65° C. Then, while at 65° C., a chelated reaction product made from 1 mole triethylaluminum-0.5 mole water-0.5 mole acetylacetone dissolved in n-heptane and diethyl ether and equivalent to 0.92 part of triethylaluminum was added as catalyst and the polymerization reaction mixture was agitated for 19 hours at 65° C.

The catalyst for this example was prepared by adding 7.2 parts of diethyl ether to a solution of the above-indicated amount of triethylaluminum, namely, 0.92 part, dissolved in 3.2 parts of n-heptane. Then, at 0° C., 0.072 part of water was added over a period of 30 minutes at 0° C., whereupon 0.4 part of acetylacetone was added over a period of 30 minutes with stirring, and the mixture was stirred for an additional hour at 0° C. The mixture was then stirred for an additional 2 hours at room temperature. The catalyst was stored at room temperature before use.

The polymerization was stopped by adding 4 parts of anhydrous ethanol. The reaction mixture was then diluted with sufficient ether to make the solution of low viscosity for ease in handling, then washing the reaction mixture first with water containing 3% of hydrogen chloride for 1 hour with agitation, then with water until neutral, then with water containing 2% of sodium bicarbonate, and again with water until neutral. An amount of 4,4′-thiobis(6-tert-butyl-m-cresol) equal to 0.5% based on the polymer was added in methanol solution to the reaction mixture, after which the polymer was recovered by evaporating the reaction mixture to dryness. The isolated total polymer was a tough snappy rubber having a reduced specific viscosity, $\eta_{sp/c}$, greater than 10 as measured on a 0.1% solution of the polymer in chloroform at 25° C.

EXAMPLE 14

A polymerization vessel in which air had been replaced with nitrogen was charged with 92 parts of n-heptane, 14.5 parts of unsubstituted oxetane,

and 0.15 part of allyl glycidyl ether dissolved in 0.9 part n-heptane, and the vessel and contents were raised to 65° C. Then, while at 65° C., the supernatant from the chelated reaction product of 1 mole triethylaluminum-1 mole acetylacetone-0.5 mole water in n-heptane and diethyl ether made from 1.37 parts of triethylaluminum was added as catalyst and the reaction mixture was agitated for 7.5 hours at 65° C., then stored at room temperature for 16 hours, and again agitated for 2 more hours at 65° C., making a total reaction time of 25.5 hours. During this time additional quantities of allyl glycidyl ether were added at 2, 4, 6, 7.5 and 23.5 hours, each quantity amounting to 0.09 part of allyl glycidyl ether dissolved in 0.5 part of n-heptane.

The catalyst for this example was made like the catalyst set forth in Example 12 above, the quantities of ingredients being based on use of 1.37 parts of triethylaluminum instead of 0.92 part, as in Example 12.

The polymerization was stopped by adding 6 parts of anhydrous ethanol, and the reaction mixture was worked up by the procedure as set forth in Example 11 above. The resulting dried copolymer, obtained in 43% yield based on the mixture of unsubstituted oxetane and allyl glycidyl ether monomers, was a very tough snappy rubber having a reduced specific viscosity, $\eta_{sp/c}$, of 38.4 as determined on a 0.1% solution of the copolymer in chloroform at 25° C. Bromine number analysis indicated the copolymer to contain 4.3% allyl glycidyl ether.

A sample of the above copolymer was cured for 45 minutes at 310° F. in the following vulcanization formula:

| Ingredient: | Parts |
|---|---|
| Copolymer | 100 |
| Zinc oxide | 5 |
| Stearic acid | 1 |
| 2-mercaptobenzothiazoledisulfide | 1 |
| Tetramethylthiuram disulfide | 2 |

The vulcanized specimen gave 91% gel and 1,140% swell in toluene (4 hours at 80° C.), thus demonstrating conclusively preparation of a uniform copolymer.

EXAMPLE 15

A polymerization vessel in which air had been replaced with nitrogen was charged with 80 parts of toluene, 10 parts of propylene oxide, and 10 parts of 3,3-bis(chloromethyl)oxetane and the vessel and contents were adjusted to 30° C. Then, while at 30° C., a chelated reaction product made from 1 mole triethylaluminum-0.5 mole acetylacetone-0.5 mole water dissolved in n-heptane and diethylether and equivalent to 0.46 part of triethylaluminum was added as catalyst, and the polymerization reaction mixture was agitated for 4.7 hours at 30° C. The catalyst for this example was similar to the catalyst set forth in Example 13 above, except the order of adding the water and acetylacetone was reversed.

The polymerization was stopped by adding 8 parts of anhydrous ethanol, and the reaction mixture was worked up by the procedure as set forth in Example 13 above to produce a snappy rubber having a reduced specific viscosity, $\eta_{sp/c}$, of 22 as determined on a 0.1% solution of the copolymer in benzene at 25° C.

EXAMPLE 16

A polymerization vessel in which air had been replaced with nitrogen was charged with 73 parts of toluene, 10 parts of epichlorohydrin and 10 parts of unsubstituted oxetane,

and the vessel and contents were adjusted to 65° C. Then, while at 65° C., a chelated reaction product made from 1 mole triethylaluminum-0.5 mole water-0.5 mole acetylacetone dissolved in n-heptane and diethylether and equivalent to 0.92 part of triethylaluminum was added as catalyst, and the polymerization reaction mixture was agitated for 7.5 hours at 65° C. The catalyst for this example was the same catalyst as described in Example 13.

The polymerization was stopped by adding 8 parts of anhydrous ethanol. The reaction mixture was then diluted with 4 volumes of ether per volume of reaction mixture, and an ether-insoluble copolymer was collected, washed twice with ether, washed once with ethanol containing 1% HCl, then washed with methanol until neutral, and finally washed once with methanol containing 0.2% of 4,4'-thiobis(6-tert-butyl-n-cresol). The washed product was dried in vacuum for 16 hours at 80° C. The resulting dried copolymer, obtained in 6% yield based on the weight of the mixture of starting monomers, was a white rubbery solid having a reduced specfic viscosity, $\eta_{sp/c}$, of 3.9 as determined on a 0.1% solution of the copolymer in α-chloronaphthalene at 100° C. Analysis of the copolymer showed that it contained 33.8% chlorine, and thus contained 88% epichlorohydrin and 12% unsubstituted oxetane. X-ray analysis indicated the copolymer to be largely amorphous.

The ether-diluted reaction mixture, after separation from the ether-insoluble copolymer, was combined with the ether washes from the work-up of the ether-insoluble copolymer and the resultant mixture was washed first wtih water containing 3% of hydrogen chloride for 1 hour with stirring, then with water until neutral, then with water containing 2% of sodium bicarbonate, and again with water until neutral. The washed mixture was then concentrated by evaporation to a relatively small volume for convenience in handling, and 5 volumes of n-heptane per volume of concentrated mixture were added to precipitate an ether-soluble, heptane-insoluble copolymer which was collected, washed twice with heptane and once with heptane containing 0.2% of 4,4'-thiobis(6-tert-butyl-m-cresol). The washed ether-soluble, heptane-insoluble copolymer was dried 16 hours in vacuum at 80° C. The resulting dried copolymer, obtained in 11% yield based on the weight of the mixture of starting monomers, was a tough snappy rubber having a reduced specific viscosity, $\eta_{sp/c}$, of 1 as determined on a 0.1% solution of the copolymer in α-chloronaphthalene at 100° C. Chlorine analysis indicated the ether-soluble, heptane-insoluble copolymer to contain 45% epichlorohydrin and 55% unsubstituted oxetane. X-ray analysis indicated the copolymer to be amorphous.

A sample of the ether-insoluble copolymer was cured for 40 minutes at 310° F. in the following vlucanization formula:

| Ingredient: | Parts |
|---|---|
| Ether-insoluble polymer | 100 |
| Tri-n-butylamine | 10 |
| Mercaptobenzothiazole | 1.5 |
| Sulfur | 2 |
| Zinc oxide | 3 |
| Stearic acid | 2 |

The vulcanized specimen gave 97% gel and 600% swell in toluene (4 hours at 80° C.).

A sample of the ether-soluble, heptane-insoluble copolymer was cured for 40 minutes at 310° F. in the following vulcanization formula:

| Ingredient: | Parts |
|---|---|
| Heptane-insoluble copolymer | 100 |
| Hexamethylenediamine carbamate | 2 |

The vulcanized specimen gave 86% gel and 605% swell in toluene (4 hours at 80° C.).

EXAMPLE 17

A polymerization vessel in which air had been replaced with nitrogen was charged with 187 parts of n-heptane, 15 parts of unsubstituted oxetane,

2.7 parts of propylene oxide and 0.3 parts allylglycidyl ether, and the vessel and contents were adjusted to 65° C. Then, at 65° C., a chelated reaction product made from 1 mole triethylaluminum-0.5 mole water-1.0 mole acetylacetone dissolved in n-heptane and diethylether and equivalent to 1.82 parts of triethylaluminum was added as catalyst, and the reaction mixture was agitated for 7.5 hours at 65° %., and then stored 16 hours at 30° C., making a total reaction time of 23.5 hours. During this time additional quantities of propylene oxide and of allylglycidyl ether were added at 2, 4, 6 and 7.5 hours, each quantity of propylene oxide being 2.7 parts, and each quantity of allylglycidyl ether being 0.3 part.

The catalyst was prepared as described in Example 13 except that twice as much acetylacetone on a molar basis was used, and quantities of ingredients were based on use of 1.82 parts triethylaluminum instead of 0.92 part, as in Example 13.

The polymerization was stopped by adding 12 parts of anhydrous ethanol. The reaction mixture was then diluted with sufficient ether to make the solution of low viscosity for ease in handling, and was washed once with water containing 3% of hydrogen chloride for 1 hour with agitation, and then several times with water. A heptane-insoluble terpolymer was then precipitated from the reaction mixture by adding thereto a large excess of n-heptane, between about 5 and 10 volumes of n-heptane per volume of reaction mixture. The heptane-insoluble terpolymer was collected, washed twice with n-heptane, then with water until neutral, and finally the terpolymer was washed once with n-heptane containing 0.2% of 4,4'-thiobis(6-tert-butyl-m-cresol) and dried 16 hours at 80° C. in vacuum. The resulting dry terpolymer, obtained in 28% yield, based on the mixture of monomers employed, was a tough snappy rubber having a reduced specific viscosity, $\eta_{sp/c}$, of 6.9 as determined on a 0.1% solution of the terpolymer in benzene at 25° C. Bromine number analysis indicated the terpolymer to contain 10% allylglycidyl ether, and the heptane insolubility of this product was good evidence that it was a terpolymer. This terpolymer was amorphous by X-ray analysis.

The heptane-diluted reaction mixture, after separation from the heptane-insoluble terpolymer, was combined with the heptane washes from the work-up of the above heptane-insoluble terpolymer, omitting the heptane wash containing 4,4'-thiobis-(6-tert-butyl-m-cresol), and the resultant mixture was concentrated by evaporation to a smaller volume for convenience in work-up. The resulting concentrated mixture was washed first with water containing 3% of hydrogen chloride for 1 hour with stirring, then with water until neutral, then with water containing 2% of sodium bicarbonate, and again with water until neutral. An amount of 4,4'-thiobis(6-tert-butyl-m-cresol) equal to 0.5% based on the polymer was added in methanol solution to the washed mixture, after which a heptane-soluble terpolymer was recovered by evaporating the mixture to dryness. The isolated heptane-soluble terpolymer, obtained in 20% yield, based on the mixture of monomers employed, was a tacky rubber which was amorphous by X-ray analysis, having a reduced specific viscosity of 5.1 as measured on a 0.1% solution of the terpolymer in benzene at 25° C. Bromine number analysis indicated this heptane-soluble terpolymer to contain 9.3% of allylglycidyl ether.

Samples of the heptane-insoluble terpolymer and of the heptane-soluble terpolymer were cured for 40 minutes at 310° F. in the following vulcanization formulas:

| Ingredient | Parts | |
| --- | --- | --- |
| Heptane-insoluble terpolymer | 100 | |
| Heptane-soluble terpolymer | | 100 |
| High abrasion furnace black | 50 | 50 |
| Zinc oxide | 5 | 5 |
| Stearic acid | 2 | 2 |
| 2-mercaptobenzothiazole disulfide | 1 | 1 |
| Tetramethylthiuram disulfide | 2 | 2 |
| Sulfur | 2 | 2 |

The following physical properties were obtained on the vulcanized specimens:

| | Heptane-insoluble terpolymer | Heptane-soluble terpolymer |
| --- | --- | --- |
| Tensile strength, pounds per sq. in. | 2,030 | 2,030 |
| Modulus (200%), pounds per sq. in. | 1,730 | 2,020 |
| Ultimate elongation, percent | 225 | 200 |
| Hardness (Shore A2) | 75 | 78 |
| Break set | 0 | 0 |

EXAMPLE 18

A polymerization vessel in which air had been replaced with nitrogen was charged with 94 parts of n-heptane, 10.5 parts of unsubstituted oxetane,

and 4.5 parts of ethylene oxide, and the vessel and contents were adjusted to 30° C. Then, while at 30° C., a chelated reaction product made from 1 mole triethylaluminum-0.5 mole water-1 mole acetylacetone dissolved in n-heptane and diethylether and equivalent to 0.68 part of triethylaluminum was added as catalyst, and the reaction mixture was agitated for 11 hours at 30° C.

The catalyst was prepared as described in Example 13 except that twice as much acetylacetone on a molar basis was used, and quantities of ingredients were based on use of 0.68 part of triethylaluminum instead of 0.92 part, as in Example 13.

The polymerization was stopped by adding 6 parts of anhydrous ethanol. The reaction mixture was then diluted with about 4 volumes of ether per volume of reaction mixture, whereupon an ether-insoluble copolymer was collected, washed with ether, then with an 80:20 mixture of ether:methanol containing 0.5% hydrogen chloride, then with an 80:20 mixture of ether:methanol until substantially neutral, and finally with ether containing 0.2% of 4,4'-thiobis(6-tert-butyl-m-cresol), and the washed polymer was dried at 80° C. in vacuum for 16 hours. The resulting dried copolymer, obtained in 5.7% yield based on the weight of the mixture of starting monomers, was a white solid with some rubber-like character (unlike poly(ethylene oxide) in this respect) and having a reduced specific viscosity, $\eta_{sp/c}$, of 7.2 as determined on a 0.1% solution of the copolymer in chloroform at 25° C. The copolymer was highly crystalline by X-ray analysis, and was water-soluble. The copolymer was found to contain 5.4% of unsubstituted oxetane, based on C and H analysis. A film of the copolymer was prepared from a water solution thereof, which film upon drying was oriented by cold drawing.

EXAMPLE 19

A polymerization vessel in which air had been replaced with nitrogen was charged with 111 parts of n-heptane, 19.4 parts of unsubstituted oxetane,

and 0.2 part of allylglycidyl ether dissolved in 1.2 parts of n-heptane, and the vessel and contents were adjusted to 65° C. Then, while at 65° C., a chelated reaction product made from 1 mole triethylaluminum-0.5 mole water-1 mole acetylacetone dissolved in n-heptane and diethylether and equivalent to 1.82 parts triethylaluminum was added as catalyst, and the polymerization reaction mixture was agitated for 7.5 hours at 65° C., then stored at room temperature for 16 hours, and again agitated for 2 more hours at 65° C., making a total of 25.5 hours reaction time. During this time additional quantities of allylglycidyl ether were added at 2, 4, 6, 7.5 and 23.5 hours, each quantity of allylglycidyl ether being 0.12 part dissolved in 0.75 part of n-heptane.

The catalyst was the same as described in Example 17.

The polymerization was stopped by adding 8 parts of anhydrous ethanol, and insoluble copolymer was collected, washed twice with n-heptane, washed once with methanol containing 0.5% of hydrogen chloride, washed neutral with methanol, washed once with methanol containing 0.1% of 4,4'-thiobis(6-tert-butyl m-cresol), and the washed copolymer was dried 16 hours at 80° C. in vacuum.

The resulting dried copolymer, obtained in 65% yield, based on mixture of monomers employed, was a very tough snappy rubber having a reduced specific viscosity, $\eta_{sp/c}$, of 37.8 as determined on a 0.1% solution of the copolymer in chloroform at 25° C. The copolymer was amorphous by X-ray analysis, and contained 3.6% of allylglycidyl ether based on Bromine number analysis.

A portion of the copolymer was compounded in the following formula.

| Ingredient: | Parts |
| --- | --- |
| Copolymer | 100 |
| High abrasion furnace black | 50 |
| Zinc oxide | 5 |
| Stearic acid | 2 |
| 2-mercaptobenzothiazole disulfide | 1 |
| Tetramethylthiuram disulfide | 2 |
| Sulfur | 2 |

A specimen of the above formula compression molded 40 minutes at 310° F. gave the following excellent physical properties:

| | |
| --- | --- |
| Tensile strength, pounds per sq. in. | 3320 |
| 300% modulus, pounds per sq. in. | 2490 |
| Elongation at break, percent | 425 |
| Break set, percent | 10 |
| Shore A2 hardness | 85 |
| Tg (brittle temperature), ° C. | about −75 |

EXAMPLE 20

A polymerization vessel in which air had been replaced with nitrogen was charged with 29 parts of n-heptane and 10 parts of unsubstituted oxetane

and the vessel and contents were adjusted to 65° C. Then, while at 65° C., a chelated reaction product made from 1 mole triethylaluminum-0.5 mole (2,3-butanedione-2-oxime)-0.5 mole water dissolved in n-heptane and diethylether and equivalent to 0.92 part of triethylaluminum was added as catalyst, and the reaction mixture was agitated 3 hours at 65° C. Additional catalyst, equal in amount to the initial catalyst quantity, was then introduced into the polymerization reaction mixture, and the polymerization reaction was continued for 16 more hours at 65° C., making a total of 19 hours reaction time.

The catalyst was prepared by reacting 1.5 parts of 2,3-butanedione-2-oxime dissolved in 28 parts of diethyl-ether with 3.45 parts of triethylaluminum dissolved in 10.5 parts of n-heptane with agitation under nitrogen at 0° C. in the presence of glass beads. The catalyst reaction mixture was then agitated for 20 hours at 30° C., cooled to 0° C. and 0.27 part of water was added, and the catalyst reaction mixture was agitated 72 hours at 30° C.

The polymerization was stopped by adding 8 parts of anhydrous ethanol, and insoluble polymer was collected, washed twice with n-heptane, washed once with methanol containing 0.5% of hydrogen chloride, washed neutral with methanol, washed once with methanol containing 0.1% of 4,4'-thiobis(6-tert-butyl-m-cresol), and the washed polymer was dried 16 hours at 80° C. in vacuum.

The resulting dried polymer, obtained in 12% yield, based on weight of unsubstituted oxetane monomer, was a tough rubbery solid having a reduced specific viscosity, $\eta_{sp/c}$, greater than 7.3 as determined on a 0.1% solution of the polymer in chloroform at 25° C. The polymer could be cold-drawn to a tough film.

EXAMPLE 21

A polymerization vessel in which air had been replaced with nitrogen was charged with 32 parts of n-heptane and 10 parts of unsubstituted oxetane

and the vessel and contents were adjusted to 65° C. Then, while at 65° C., a chelated reaction product made from 1 mole triethylaluminum-0.5 mole water-0.2 mole acetylacetone dissolved in n-heptane and diethylether and equivalent to 0.46 part of triethylaluminum was added as catalyst, and the polymerization reaction mixture was agitated for 19 hours at 65° C.

The catalyst was prepared by the procedure set forth in Example 13, employing a mole ratio of 1 mole triethylaluminum-0.5 mole water-0.2 mole acetylacetone in place of 1 mole triethylaluminum-0.5 mole water-0.5 mole acetylacetone, and quantities of ingredients were based on use of 0.46 part triethylaluminum instead of 0.92 part, as in Example 13.

The polymerization reaction was stopped by adding 4 parts of anhydrous ethanol, and insoluble polymer was collected, washed twice with n-heptane, washed once with methanol containing 0.5% of hydrogen chloride, washed neutral with methanol, washed once with methanol containing 0.1% of 4,4'-thiobis(6-tert-butyl-m-cresol), and the washed polymer was dried 16 hours at 80° C. in vacuum.

The resulting dried polymer, obtained in 70% yield, based on weight of unsubstituted oxetane monomer, was a tough rubber which was cold-drawn to a strong film. The reduced specific viscosity of the polymer was 7.4 as determined on a 0.1% solution of the polymer in chloroform at 25° C.

As may be seen from the foregoing description, the process of this invention makes it possible to produce a wide variety of oxetane polymers and copolymers with epoxides having molecular weight in excess of 10,000 which expressed in terms of reduced specific viscosity as set forth herein means at least 0.3. Moreover, this invention affords advantages in the bulk polymerization of oxetanes at polymer melt temperatures, and opens the way for conducting continuous isothermal bulk polymerization in tubular reactors, since polymerization at polymer melt temperatures proceeds at such a rate that excess exothermal heat of polymerization is readily removed by convection and conduction through the reactor walls, thus greatly simplifying plant facilities necessary for conducting bulk polymerization at polymer melt temperatures.

Moreover, the polymers produced in accordance with this invention may be used for a wide variety of applications. These polymers are suitable for the various conventional thermoplastic uses such as molding to form various shaped articles; extrusion to form articles such as film, filaments, sheeting, strip and tubing, calendering to form film, sheeting and coating of paper or fabrics; and laminating to form counter tops, industrial board and the like. Those polymers which contain ethylenically unsaturated groups are additionally useful for preparing sulfur-vulcanizable elastomeric polymers.

What I claim and desire to protect by Letters Patent is:

1. The process of preparing polymeric oxetanes which comprises polymerizing a monomeric oxetane by contacting said monomeric oxetane at a temperature from about —50° C. to about 300° C. with, as the catalyst for the polymerization reaction, a reaction product formed by reacting a hydrocarbonaluminum compound of the group consisting of trihydrocarbonaluminum in which the hydrocarbon radical is selected from the group consisting of alkyl, alkenyl, cycloalkyl and aryl radicals, and dihydrocarbonaluminum hydride in which the hydrocarbon radical is selected from the group consisting of alkyl and cycloakyl radicals, with from about 0.01 mole to about 2 moles of a chelating agent per mole of said hydrocarbonaluminum compound, said reaction product being present in a catalytic amount from about 10 p.p.m. to about 100,000 p.p.m. by weight of said oxetane sufficient to catalyze polymerization of said oxetane monomer to a polymer having a molecular weight of at least 10,000, said reaction product being characterized by the following graphic formula:

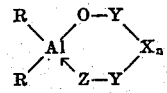

in which R represents hydrocarbon radical, each Y represents an element of the group consisting of carbon and nitrogen, X represents carbon, n is a numeral from 0 to 2, and Z is an oxygen atom forming a coordinate bond with the aluminum, said oxetane monomer being free of groups other than oxetane groups which are reactive with said catalyst, said chelating agent being characterized by two functional groups, one of said functional groups being a reactive —OH group selected from the group consisting of alcoholic hydroxyl, the hydroxyl of a carboxyl group, and the hydroxyl in the enol form of a ketone which hydroxyl group reacts with said hydrocarbonaluminum compound to form a conventional bond sequence of the group consisting of aluminum-oxygen-carbon and aluminum-oxygen-nitrogen, and the other of said functional groups being an oxygen atom which forms a coordinate bond with the aluminum of said hydrocarbonaluminum compound and selected from the group consisting of oxygen of a carbonyl group, oxygen of an ether group, oxygen of a nitroso group and oxygen of a nitro group.

2. The process of preparing copolymers of oxetanes which comprises copolymerizing a mixture consisting of oxetane monomers by contacting said mixture of oxetane monomers at a temperature from about —50° C. to about 300° C. with, as the catalyst for the polymerization reaction, a reaction product formed by reacting a hydrocarbonaluminum compound of the group consisting of trihydrocarbonaluminum in which the hydrocarbon radical is selected from the group consisting of alkyl, alkenyl, cycloalkyl and aryl radicals, and dihydrocarbonaluminum hydride in which the hydrocarbon radical is selected from the group consisting of alkyl and cycloalkyl radicals, th from about 0.01 mole to about 2 moles of a chelating ent per mole of said hydrocarbonaluminum compound, id reaction product being present in a catalytic amount om about 10 p.p.m. to about 100,000 p.p.m. by weight said monomers sufficient to catalyze polymerization of id mixture of oxetane monomers to a copolymer having a molecular weight of at least 10,000, said reaction oduct being characterized by the following graphic rmula:

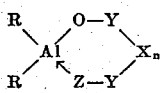

which R represents hydrocarbon radical, each Y represents an element of the group consisting of carbon and rogen, X represents carbon, $n$ is a numeral from 0 to 2, d Z is an oxygen atom forming a coordinate bond with aluminum, said oxetane monomers being free of groups her than oxetane groups which are reactive with said talyst, said chelating agent being characterized by two nctional groups, one of said functional groups being a active —OH group selected from the group consisting alcoholic hydroxyl, the hydroxyl of a carboxyl group, d the hydroxyl in the enol form of a ketone which droxyl group reacts with said hydrocarbonaluminum mpound to form a conventional bond sequence of the oup consisting of aluminum-oxygen-carbon and aluminum-oxygen-nitrogen, and the other of said functional oups being an oxygen atom which forms a coordinate nd with the aluminum of said hydrocarbonaluminum mpound and selected from the group consisting of ygen of a carbonyl group, oxygen of an ether group, ygen of a nitroso group and oxygen of a nitro group.

3. The process of preparing copolymers of oxetanes d epoxides which comprises copolymerizing a mixture nsisting essentially of oxetane and monoepoxide monoers, said monoepoxide being vicinal epoxide, by conting said mixture of oxetane and monoepoxide monoers at a temperature from about —50° C. to about 0° C. with, as the catalyst for the polymerization reacn, a reaction product formed by reacting a hydrorbonaluminum compound of the group consisting of hydrocarbonaluminum in which the hydrocarbon radil is selected from the group consisting of alkyl, alkenyl, cloalkyl and aryl radicals, and dihydrocarbonaluminum dride in which the hydrocarbon radical is selected from group consisting of alkyl and cycloalkyl radicals, th from about 0.01 mole to about 2 moles of a chelating ent per mole of said hydrocarbonaluminum compound, d reaction product being present in a catalytic amount om about 10 p.p.m. to about 100,000 p.p.m. by weight said monomers sufficient to catalyze polymerization of d mixture of oxetane and monoepoxide monomers to a polymer having a molecular weight of at least 10,000, d reaction product being characterized by the following aphic formula:

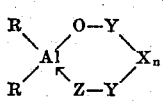

which R represents hydrocarbon radical, each Y represents an element of the group consisting of carbon and rogen, X represents carbon, $n$ is a numeral from 0 to 2, d Z is an oxygen atom forming a coordinate bond with aluminum, said oxetane and monoepoxide monomers ing free of groups other than oxetane and oxirane oups, respectively, which are reactive with said catat, said chelating agent being characterized by two nctional groups, one of said functional groups being a ictive —OH group selected from the group consisting alcoholic hydroxyl, the hydroxyl of a carboxyl group, d the hydroxyl in the enol form of a ketone which hydroxyl group reacts with said hydrocarbonaluminum compound to form a conventional bond sequence of the group consisting of aluminum-oxygen-carbon and aluminum-oxygen-nitrogen, and the other of said functional groups being an oxygen atom which forms a coordinate bond with the aluminum of said hydrocarbonaluminum compound and selected from the group consisting of oxygen of a carbonyl group, oxygen of an ether group, oxygen of a nitroso group and oxygen of a nitro group.

4. The process of preparing polymeric 3,3-disubstituted oxetanes which comprises polymerizing a 3,3-disubstituted oxetane monomer by contacting said oxetane monomer at a temperature from about —50° C. to about 300° C. with, as the catalyst for the polymerization reaction, a reaction product formed by reacting a hydrocarbonaluminum compound of the group consisting of trihydrocarbonaluminum in which the hydrocarbon radical is selected from the group consisting of alkyl, alkenyl, cycloalkyl and aryl radicals, and dihydrocarbonaluminum hydride in which the hydrocarbon radical is selcted from the group consisting of alkyl and cycloalkyl radicals, with from about 0.01 mole to about 2 moles of a chelating agent per mole of said hydrocarbonaluminum compound, said reaction product being present in a catalytic amount from about 10 p.p.m. to about 100,000 p.p.m. by weight of said monomer sufficient to catalyze polymerization of said oxetane monomer to a polymer having a molecular weight of at least 10,000, said reaction product being characterized by the following graphic formula:

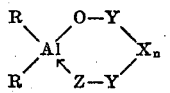

in which R represents hydrocarbon radical, each Y represents an element of the group consisting of carbon and nitrogen, X represents carbon, $n$ is a numeral from 0 to 2, and Z is an oxygen atom forming a coordinate bond with the aluminum, said oxetane monomer being free of groups other than oxetane groups which are reactive with said catalyst, said chelating agent being characterized by two functional groups, one of said functional groups being a reactive —OH group selected from the group consisting of alcoholic hydroxyl, the hydroxyl of a carboxyl group, and the hydroxyl in the enol form of a ketone which hydroxyl group reacts with said hydrocarbonaluminum compound to form a conventional bond sequence of the group consisting of aluminum-oxygen-carbon and aluminum-oxygen-nitrogen, and the other of said functional groups being an oxygen atom which forms a coordinate bond with the aluminum of said hydrocarbonaluminum compound and selected from the group consisting of oxygen of a carbonyl group, oxygen of an ether group, oxygen of a nitroso group and oxygen of a nitro group.

5. The process of preparing polymeric 3,3-bis(chloromethyl) oxetane which comprises polymerizing 3,3-bis(chloromethyl) oxetane by contacting said 3,3-bis(chloromethyl) oxetane at a temperature from about —50° C. to about 300° C. with, as the catalyst for the polymerization reaction, a reaction product formed by reacting a hydrocarbonaluminum compound of the group consisting of trihydrocarbonaluminum in which the hydrocarbon radical is selcted from the group consisting of alkyl, alkenyl, cycloalkyl and aryl radicals, and dihydrocarbonaluminum hydride in which the hydrocarbon radical is selected from the group consisting of alkyl and cycloalkyl radicals, with from about 0.01 mole to about 2 moles of a chelating agent per mole of said hydrocarbonaluminum compound, said reaction product being present in a catalytic amount from about 10 p.p.m. to about 100,000 p.p.m. by weight of said oxetane sufficient to catalyze polymerization of said oxetane to a polymer having a molecular weight of at least 10,000, said reaction product being characterized by the following graphic formula:

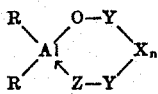

in which R represents hydrocarbon radical, each Y represents an element of the group consisting of carbon and nitrogen, X represents carbon, $n$ is a numeral from 0 to 2, and Z is an oxygen atom forming a coordinate bond with the aluminum, said chelating agent being characterized by two functional groups, one of said functional groups being a reactive —OH group selcted from the group consisting of alcoholic hydroxyl, the hydroxyl of a carboxyl group, and the hydroxyl in the enol form of a ketone which hydroxyl group reacts with said hydrocarbonaluminum compound to form a conventional bond sequence of the group consisting of aluminum-oxygen-carbon and aluminum-oxygen-nitrogen, and the other of said functional groups being an oxygen atom which forms a coordinate bond with the aluminum of said hydrocarbonaluminum compound and selected from the group consisting of oxygen of a carbonyl group, oxygen of an ether group, oxygen of a nitroso group and oxygen of a nitro group.

6. The process of preparing polymeric 3,3-bis(chloromethyl) oxetane which comprises polymerizing 3,3-bis(chloromethyl) oxetane to a polymer having a molecular weight of at least 10,000 by subjecting said oxetane to a temperature from about 100° C. to about 260° C. in the presence of, as the catalyst for the polymerization reaction, from about 10 p.p.m. to about 15,000 p.p.m. by weight of said oxetane of a reaction product formed by reacting a hydrocarbonaluminum compound of the group consisting of trihydrocarbonaluminum in which the hydrocarbon radical is selected from the group consisting of alkyl, alkenyl, cycloalkyl and aryl radicals, and dihydrocarbonaluminum hydride in which the hydrocarbon radical is selected from the group consisting of alkyl and cycloalkyl radicals, with from about 0.01 mole to about 2 moles of a chelating agent per mole of said hydrocarbonaluminum compound, said reaction product being characterized by the following graphic formula:

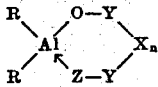

in which R represents hydrocarbon radical, each Y represents an element of the group consisting of carbon and nitrogen, X represents carbon, $n$ is a numeral from 0 to 2, and Z is an oxygen atom forming a coordinate bond with the aluminum, said chelating agent being characterized by two functional groups, one of said functional groups being a reactive —OH group selected from the group consisting of alcoholic hydroxyl, the hydroxyl of a carboxyl group, and the hydroxyl in the enol form of a ketone which hydroxyl group reacts with said hydrocarbonaluminum compound to form a conventional bond sequence of the group consisting of aluminum-oxygen-carbon and aluminum-oxygen-nitrogen, and the other of said functional groups being an oxygen atom which forms a coordinate bond with the aluminum of said hydrocrabonaluminum compound and selcted from the group consisting of oxygen of a carbonyl group, oxygen of an ether group, oxygen of a nitroso group and oxygen of a nitro group.

7. The process of preparing polymeric oxetanes which comprises polymerizing a monomeric oxetane by contacting said oxetane at a temperature from about —50° C. to about 300° C. with, as the catalyst for the polymerization reaction, a reaction product formed by reacting a hydrocarbonaluminum compound of the group consisting of trihydrocarbonaluminum in which the hydrocarbon radical is selected from the group consisting of alkyl, alkenyl, cycloalkyl and aryl radicals, and dihydrocarbon- aluminum hydride in which the hydrocarbon radical is selected from the group consisting of alkyl and cycloalkyl radicals, with from about 0.01 mole to about 1 mole of a chelating agent per mole of said hydrocarbonaluminum compound and with up to 1 mole of water per mole of said hydrocarbonaluminum compound, said reaction product being present in a catalytic amount from about 10 p.p.m. to about 100,000 p.p.m. by weight of said oxetane sufficient to catalyze polymerization of said oxetane monomer to a polymer having a molecular weight of at least 10,000, said reaction product being characterized by the following graphic formula:

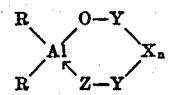

in which R represents hydrocarbon radical, each Y represents an element of the group consisting of carbon and nitrogen, X represents carbon, $n$ is a numeral from 0 to 2, and Z is an oxygen atom forming a coordinate bond with the aluminum, said oxetane monomer being free of groups other than oxetane groups which are reactive with said catalyst, said chelating agent being characterized by two functional groups, one of said functional groups being a reactive —OH group selected from the group consisting of alcoholic hydroxyl, the hydroxyl of a carboxyl group, and the hydroxyl in the enol form of a ketone which hydroxyl group reacts with said hydrocarbonaluminum compound to form a conventional bond sequence of the group consisting of aluminum-oxygen-carbon and aluminum-oxygen-nitrogen, and the other of said functional groups being an oxygen atom which forms a coordinate bond with the aluminum of said hydrocarbonaluminum compound and selected from the group consisting of oxygen of a carbonyl group, oxygen of an ether group, oxygen of a nitroso group and oxygen of a nitro group.

8. The process for preparing a homopolymer of unsubstituted oxetane, said homopolymer having a molecular weight of at least 10,000, which comprises polymerizing monomeric oxetane having the formula:

by contacting said monomeric oxetane in an inert reaction diluent and at a temperature below about 100° C. with, as the catalyst for the polymerization reaction, a reaction product formed by reacting a hydrocarbonaluminum compound of the group consisting of trihydrocarbonaluminum in which the hydrocarbon radical is selected from the group consisting of alkyl, alkenyl, cycloalkyl and aryl radicals, and dihydrocarbonaluminum hydride in which the hydrocarbon radical is selected from the group consisting of alkyl and cycloalkyl radicals, with from about 0.01 mole to about 2 moles of a chelating agent per mole of said hydrocarbonaluminum compound, said reaction product being present in a catalytic amount from about 15,000 p.p.m. to about 100,000 p.p.m. by weight of said oxetane sufficient to catalyze polymerization of said oxetane monomer to a polymer having a molecular weight of at least 10,000, said reaction product being characterized by the following graphic formula:

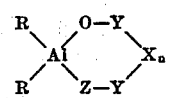

in which R represents hydrocarbon radical, each Y represents an element of the group consisting of carbon and nitrogen, X represents carbon, $n$ is a numeral from 0 to 2, and Z is an oxygen atom forming a coordinate bond with the aluminum, said chelating agent being characterized by two functional groups, one of said functional groups being a reactive —OH group selected from the group consisting of alcoholic hydroxyl, the hydroxyl of a carboxyl group, and the hydroxyl in the enol form of a ketone, which hydroxyl group reacts with said hydrocarbonaluminum compound to form a conventional bond sequence of the group consisting of aluminum-oxygen-carbon and aluminum-oxygen-nitrogen, and the other of said functional groups being an oxygen atom which forms a coordinate bond with the aluminum of said hydrocarbonaluminum compound and selected from the group consisting of oxygen of a carbonyl group, oxygen of an ether group, oxygen of a nitroso group and oxygen of a nitro group.

9. The process in accordance wth claim 3 in which the hydrocarbonaluminum compound is a trialkylaluminum.

10. The process in accordance wth claim 3 in which the mixture of oxetane and epoxide monomers in a mixture of unsubstituted oxetane and allyl glycidyl ether.

11. The process in accordance with claim 3 in which the mixture of oxetane and epoxide monomers in a mixture of unsubstituted oxetane and epichlorohydrin.

12. The process in accordance with claim 3 in which the mixture of oxetane and epoxide monomers is a mixture of unsubstituted oxetane, allyl glycidyl ether, and an alkylene oxide.

13. The process in accordance with claim 3 in which the mixture of oxetane and epoxide monomers is a mixture of an oxetane monomer and an alkylene oxide monomer.

14. The process of preparing polymeric 3,3-bis(chloromethyl) oxetane which comprises polymerizing 3,3-bis(chloromethyl) oxetane by contacting said oxetane at a temperature from about —50° C. to about 300° C. with, as the catalyst for the polymerization reaction, a reaction product formed by reacting triisobutylaluminum with 2,4-pentanedione, said reaction product being present in a catalytic amount from about 10 p.p.m. to about 100,000 p.p.m. by weight of said oxetane sufficient to catalyze polymerization of said oxetane to a polymer having a molecular weight of at least 10,000, the ratio of said 2,4-pentanedione to said triisobutylaluminum being from about 0.01 mole to about 2 moles per mole of triisobutylaluminum.

15. The process of preparing polymeric 3,3-bis(chloromethyl) oxetane which comprises polymerizing 3,3-bis(chloromethyl) oxetane by contacting said oxetane at a temperature from about —50° C. to about 300° C. with, as the catalyst for the polymerization reaction, a reaction product formed by reacting triisobutylaluminum with 3-hydroxy-2-propanone, said reaction product being present in a catalytic amount from about 10 p.p.m. to about 100,000 p.p.m. by weight of said oxetane sufficient to catalyze polymerization of said oxetane to a polymer having a molecular weight of at least 10,000, the ratio of said 3-hydroxy-2-propanone to said triisobutylaluminum being from about 0.01 mole to about 2 moles per mole of triisobutylaluminum.

16. The process of preparing polymeric 3,3-bis(chloromethyl) oxetane which comprises polymerizing 3,3-bis(chloromethyl) oxetane by contacting said oxetane at a temperature from about —50° C. to about 300° C. with, as the catalyst for the polymerization reaction, a reaction product formed by reacting triisobutylaluminum with ethoxyacetic acid, said chelated reaction product being present in a catalytic amount from about 10 p.p.m. to about 100,000 p.p.m. by weight of said oxetane sufficient to catalyze polymerization of said oxetane to a polymer having a molecular weight of at least 10,000, the ratio of said ethoxyacetic acid to said triisobutylaluminum being from about 0.01 mole to about 2 moles per mole of triisobutylaluminum.

17. The process of preparing polymeric oxetanes which comprises polymerizing an oxetane monomer by contacting said oxetane monomer at a temperature from about —50° C. to about 300° C. with, as the catalyst for the polymerization reaction, a reaction product formed by reacting triethylaluminum with 2,4-pentanedione and with water, said reaction product being present in a catalytic amount from about 10 p.p.m. to about 100,000 p.p.m. by weight of said monomer sufficient to catalyze polymerization of said oxetane to a polymer having a molecular weight of at least 10,000, the ratio of said 2,4-pentanedione to said triethylaluminum being from about 0.01 mole to about 1 mole per mole of triethylaluminum, and the ratio of said water to said triethylaluminum being up to 1 mole of water per mole of triethylaluminum said oxetane monomer being free of groups other than oxetane groups which are reactive with said catalyst.

18. The process of preparing polymeric oxetanes which comprises polymerizing an oxetane monomer by contacting said oxetane monomer at a temperature from about —50° C. to about 300° C. with, as the catalyst for the polymerization reaction, a reaction product formed by reacting triethylaluminum with 2,3-butanedione-2-oxime and with water, said reaction product being present in a catalytic amount from about 10 p.p.m. to about 100,000 p.p.m. by weight of said monomer sufficient to catalyze polymerization of said oxetane to a polymer having a molecular weight of at least 10,000, the ratio of said 2,3-butanedione-2-oxime to said triethylaluminum being from about 0.01 mole to about 1 mole per mole of triethylaluminum, and the ratio of said water to said triethylaluminum being up to 1 mole of water per mole of triethylaluminum said oxetane monomer being free of groups other than oxetane groups which are reactive with said catalyst.

19. The process of preparing polymeric 3,3-bis(chloromethyl) oxetane which comprises polymerizing 3,3-bis(chloromethyl) oxetane by contacting said oxetane at a temperature from about —50° C. to about 300° C. with, as the catalyst for the polymerization reaction, a reaction product formed by reacting triisobutylaluminum with 2,4-pentanedione and with water, said reaction product being present in a catalytic amount from about 10 p.p.m. to about 100,000 p.p.m. by weight of said oxetane sufficient to catalyze polymerization of said oxetane to a polymer having a molecular weight of at least 10,000, the ratio of said 2,4-pentanedione to said triisobutylaluminum being from about 0.01 mole to about 1 mole per mole of triisobutylaluminum, and the ratio of said water to said triisobutylaluminum being up to 1 mole of water per mole of triisobutylaluminum.

20. The process of preparing polymeric 3,3-bis(chloromethyl) oxetane which comprises polymerizing 3,3-bis(chloromethyl) oxetane to a polymer having a molecular weight of at least 10,000 by subjecting said oxetane to a temperature from about 100° C. to about 260° C. in the presence of, as the catalyst for the polymerization reaction, from about 10 p.p.m. to about 15,000 p.p.m. by weight of said oxetane of a reaction product formed by reacting 2,4-pentanedione with triisobutylaluminum in the ratio of from about 0.1 mole to about 1 mole of 2,4-pentanedione per mole of triisobutylaluminum.

21. The process of preparing polymeric 3,3-bis(chloromethyl) oxetane which comprises polymerizing 3,3-bis(chloromethyl) oxetane to a polymer having a molecular weight of at least 10,000 by subjecting said oxetane to a temperature from about 100° C. to about 260° C. in the presence of, as the catalyst for the polymerization reaction, from about 10 p.p.m. to about 15,000 p.p.m. by weight of said oxetane of a reaction product formed by reacting 2,4-pentanedione and water with triisobutylaluminum in the ratio of from about 0.1 mole to about 1 mole of 2,4-pentanedione and from about 0.1 mole to about 1 mole of water per mole of triisobutylaluminum.

(References on following page)

References Cited by the Examiner

UNITED STATES PATENTS

| | | | |
|---|---|---|---|
| 2,870,100 | 1/59 | Stewart et al. | 260—2 |
| 2,870,101 | 1/59 | Stewart et al. | 260—2 |
| 2,891,837 | 6/59 | Campbell | 260—20 |
| 2,895,924 | 7/59 | Hudy | 260—20 |
| 2,941,981 | 6/60 | Elbling et al. | 260—2 |
| 3,058,923 | 10/62 | Kutner | 260—2 |

OTHER REFERENCES

Kambara et al., J. Poly. Sci., vol. 27, 584 (1958).
Patterson et al., J. Am. Chem. Soc., 4213, 1959.
Zeiss, Organo-Metallic Chemistry, 1960 (page 237 relied on).

WILLIAM H. SHORT, *Primary Examiner.*

PHILIP E. MANGAN, JOSEPH R. LIBERMAN,
*Examiners.*

UNITED STATES PATENT OFFICE
CERTIFICATE OF CORRECTION

Patent No. 3,205,183                        September 7, 1965

Edwin J. Vandenberg

It is hereby certified that error appears in the above numbered patent requiring correction and that the said Letters Patent should read as corrected below.

Column 3, line 16, for "equa-" read -- equation: --; lines 18 to 24, the left-hand portion of the formula should appear as shown below instead of as in the patent:

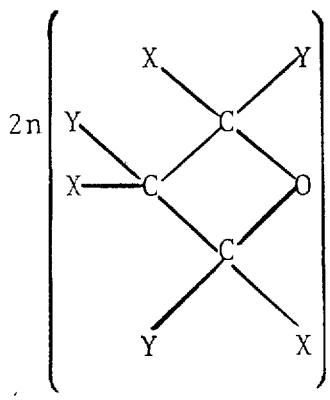

Same column 3, line 50, for "acylaminoalkyl" read -- acylamidoalkyl --; column 4, line 1, strike out "oxetane; and the like; vinyl-3,3-bis(chloromethyl)oxe"; line 30, for "2-methyloxy-" read -- 2-methoxy- --; column 7, line 13, for "unsaturated" read -- unsubstituted --; column 9, lines 35 to 44, the left-hand formula should appear as shown below instead of as in the patent:

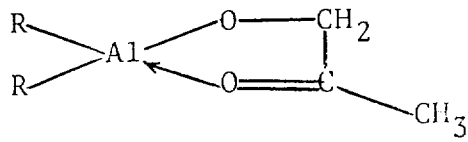

column 13, line 68, for "monometer" read -- monomer --; column 18, line 28, for "65°%" read -- 65° C. --; column 25, line 13, for "selcted" read -- selected --; lines 62 and 63, for "hydrocrabonaluminum" read -- hydrocarbonaluminum --; line 63, for "selcted" read -- selected --; column 26, lines 65 to 70, the formula should appear as shown below instead of as in the patent:

column 27, lines 19 and 21, for "in", each occurrence, read -- is --; line 65, strike out "chelated".

Signed and sealed this 10th day of May 1966.

(SEAL)
Attest:

ERNEST W. SWIDER
Attesting Officer

EDWARD J. BRENNER
Commissioner of Patents